US006788822B1

(12) United States Patent
Zhang et al.

(10) Patent No.: US 6,788,822 B1
(45) Date of Patent: Sep. 7, 2004

(54) METHOD AND DEVICE FOR CORRECTING LIGHTNESS OF IMAGE

(75) Inventors: Xiaomang Zhang, Tenri (JP); Noboru Kubo, Ikoma (JP); Hiroyuki Okuhata, Osaka (JP); Akimasa Niwa, Osaka (JP)

(73) Assignees: Sharp Kabushiki Kaisha, Osaka (JP); Synthesis Corporation, Osaka (JP)

( * ) Notice: Subject to any disclaimer, the term of this patent is extended or adjusted under 35 U.S.C. 154(b) by 638 days.

(21) Appl. No.: 09/651,117

(22) Filed: Aug. 30, 2000

(30) Foreign Application Priority Data

Aug. 31, 1999 (JP) .......................................... 11-246792

(51) Int. Cl.[7] .................................................. G06K 9/40
(52) U.S. Cl. ...................................... 382/254; 382/260
(58) Field of Search ................................ 382/254, 260, 382/274, 162, 279; 358/447, 448, 530, 532

(56) References Cited

U.S. PATENT DOCUMENTS 5,991,456 A * 11/1999 Rahman et al. ............. 382/254

OTHER PUBLICATIONS

Jobson et al., IEEE Transactions on Image Processing, vol. 6, No. 3, pp. 451–462 (1997).

Jobson et al., IEEE Transaction on Image Processing, vol. 6, No. 7, pp. 965–976 (1997).

* cited by examiner

Primary Examiner—Samir Ahmed
Assistant Examiner—Vikkram Bali
(74) Attorney, Agent, or Firm—Birch, Stewart, Kolasch & Birch, LLP

(57) ABSTRACT

A method for correcting lightness of an image includes the steps of: calculating a first scale and a second scale based on an image scale of an original image from image information of the original image; multiscale retinex processing the original image with respect to the first scale and the second scale; and synthesizing a result of the multiscale retinex processing with the image information of the original image.

8 Claims, 3 Drawing Sheets

METHOD AND DEVICE FOR CORRECTING LIGHTNESS OF IMAGE

BACKGROUND OF THE INVENTION

1. Field of the Invention

The present invention relates to a method for correcting lightness of an image, which provides a desired, optimum dynamic range to a digital still color picture that has been captured by a digital camera, a monitoring camera, etc.

2. Description of the Related Art

As a method for correcting lightness information, color information, etc., of a digital still color image, a retinex method taking a retina of an eyeball as a model is proposed, in which a lightness value of an image with a biased dynamic range (dynamic characteristic) is corrected based on local information of the image. In such a retinex method, the quality of an image can be improved by correcting a low lightness value resulting in a darker portion in the image to a high lightness value, and a high lightness value resulting in a brighter portion in the image to a low lightness value.

As examples of such a retinex method, the single scale retinex method (Daniel J, Jobson, et al., "Properties and Performance of a Center/Surround Retinex," IEEE Trans. on Image Processing vol.6, pp.451–462, March 1997) and the multiscale retinex method (Daniel J, Jobson, et al., "A Multiscale Retinex for Bridging the Gap Between Color Image and the Human Observation of Scenes," IEEE Trans. on Image Processing vol.6, pp.956–976, July 1997) are proposed.

In the single scale retinex method, a spectrum component $I_i(x,y)$ (i=1, 2, . . . ) of a subject pixel $I(x,y)$ in an original image is corrected by a surround function $F(x,y)$ obtained from image information of the surround pixels. The result $R_i$ of retinex processing is represented by expression (1):

$$R_i = \log(I_i(x,y)) - \log[F(x,y) * I_i(x,y)] \quad \ldots (1)$$

where "*" denotes a convolution operator.

In this case, the surround function $F(x,y)$ is a function which is based on the image information of the surround pixels with respect to the subject pixel $I(x,y)$, which is represented by expression (2):

$$F(x,y) = K e^{-r^2/c^2} \quad \ldots (2)$$

where r denotes a distance ($r^2 = X^2 + y^2$) between the subject pixel and the surround pixel, and c is a scaling variable. Furthermore, K is a scalar coefficient, which is set so that $\iint F(x,y)dxdy = 1$ is satisfied, i.e., the total value of the surround function is 1.

After the result $R_i(x,y)$ of the single scale retinex processing has been obtained, the result $R_i(x,y)$ is corrected with a gain correction value Ag and an offset correction value Ao, and extended to conform to an appropriate dynamic range. A result of the correction retinex processing, $I_{Ri}$, is represented by expression (3):

$$I_{R_i} = Ag \times R_i + Ao \quad \ldots (3)$$

As described above, in the single scale retinex method, the spectrum band components of the subject pixel are retinex-processed based on the surround function. On the other hand, in the color restoration multiscale retinex (MSR) method, each of the spectrum band components, $I_i$, of the subject pixel is retinex-processed by N types of scales. In this case, the result of the single retinex process for each of the N scales is multiplied by a weighting factor $\omega_n$, and the multiscale results with respect to all the scales are totaled. The result of the multiscale retinex (MSR) processing, $R_{MSRi}$, is represented by expression (4):

$$R_{MSR_i} = \sum_{n=1}^{N} \omega_n R_{n_i} \quad (4)$$

The result of the MSR processing, RMSRi, which has been obtained by expression (4), is then corrected with a color correction coefficient $C_i(x,y)$ that is represented by expression (5):

$$C_i(x, y) = \beta \left\{ \log[\alpha I_i(x, y)] - \log\left[\sum_{i=1}^{S} I_i(x, y)\right] \right\} \quad (5)$$

The result of the MSR processing, $R_{MSRi}$, obtained by expression (4) is corrected by the color correction coefficient $C_i(x,y)$ of expression (5), thereby obtaining the result of the color correction multiscale retinex processing, $R_{MSRCRi}(x,y)$, as shown in expression (6):

$$R_{MSRCR_i}(x,y) = C_i(x,y) \cdot R_{MSR_i}(x,y) \quad \ldots (6)$$

The result of the color correction multiscale retinex processing, $_{RMSRCRi}(x,y)$, is corrected, as described as to the single scale retinex method, with the gain correction value Ag and the offset correction value Ao which are correction parameters, and extended to conform to an appropriate dynamic range. A result of the final color correction multiscale retinex processing, $I_{MSRCRi}$, is represented by expression (7):

$$I_{MSRCR_i} = Ag \times R_{MSRCR_i} + Ao \quad \ldots (7)$$

In the color correction multiscale retinex method, an original image is generally single scale retinex processed with respect to three scales (small, medium, and large scales), whereby corrected images corresponding to the respective scales are obtained. These corrected images are synthesized to obtain an image with corrected lightness and color. In the small scale, a distance between a subject pixel and a surround pixel (the radius of the small scale) is relatively short, whereas in the large scale, a distance between a subject pixel and a surround pixel (the radius of the large scale) is relatively long. In the medium scale, a distance between the subject pixel and a surround pixel (the radius of the medium scale) is set to a length intermediate between that of the small scale and that of the large scale.

In each of the small, medium, and large scales, the scale size thereof is fixed, and is not an appropriate size for making a desirable correction. Accordingly, a correction result widely varies in accordance with the size or color of an original image to be corrected, whereby a sufficient correction effect may not be obtained. Especially in the case where the size of an image is large, if the scale size of the small scale is fixed at a small size, a noise may be generated in a corrected image.

Furthermore, the correction parameters shown in expression (7), i.e., the gain correction value Ag and the offset correction value Ao, are fixed values. With such parameters, in some images, the lightness of pixels may not be corrected so as to conform to an appropriate dynamic range.

Thus, with the conventional color correction multiscale retinex method, sufficient flexibility in correcting images cannot be obtained, and some images may not be corrected appropriately. Therefore, the conventional color correction multiscale retinex method is less than satisfactory as a method for correcting the lightness of images.

SUMMARY OF THE INVENTION

According to one aspect of the present invention, the method for correcting lightness of an image includes the steps of: calculating a first scale and a second scale based on an image scale of an original image from image information of the original image; multiscale retinex processing the original image with respect to the first scale and the second scale; and synthesizing a result of the multiscale retinex processing with the image information of the original image.

In one embodiment of the present invention, the method for correcting lightness of an image further includes the step of correcting the result of the multiscale retinex processing based on a gain correction value and an offset correction value.

In another embodiment of the present invention, the offset correction value is corrected based on a histogram of a lightness value against the number of pixels of the original image.

In still another embodiment of the present invention, the first scale is a small scale, and the second scale is a large scale.

In still another embodiment of the present invention, a radius of the large scale is about ½ of a longer side of the original image.

In still another embodiment of the present invention, a radius of the small scale is about ⅕ of a longer side of the original image.

According to another aspect of the present invention, the image processing device includes: a scale size calculating section for calculating a first scale and a second scale based on an image scale of an original image from image information of the original image; and a scale retinex processing section for multiscale retinex processing the original image with respect to the first scale and the second scale, wherein a result of the multiscale retinex processing is synthesized with the image information, thereby generating an output image.

In one embodiment of the present invention, the result of the multiscale retinex processing is corrected based on a gain correction value and an offset correction value.

In another embodiment of the present invention, the offset correction value is corrected based on a histogram of the lightness value against the number of pixels of the original image.

In still another embodiment of the present invention, the first scale is a small scale, and the second scale is a large scale.

In still another embodiment of the present invention, a radius of the large scale is about ½ of a longer side of the original image.

In still another embodiment of the present invention, a radius of the small scale is about ⅕ of a longer side of the original image.

Thus, the invention described herein makes possible the advantages of (1) providing a method for correcting the lightness of images, by which an appropriate dynamic range conformable to the size of the images can be obtained, and (2) providing an image processing device using such a correction method.

These and other advantages of the present invention will become apparent to those skilled in the art upon reading and understanding the following detailed description with reference to the accompanying figures.

DESCRIPTION OF THE PREFERRED EMBODIMENTS

Figure 1:
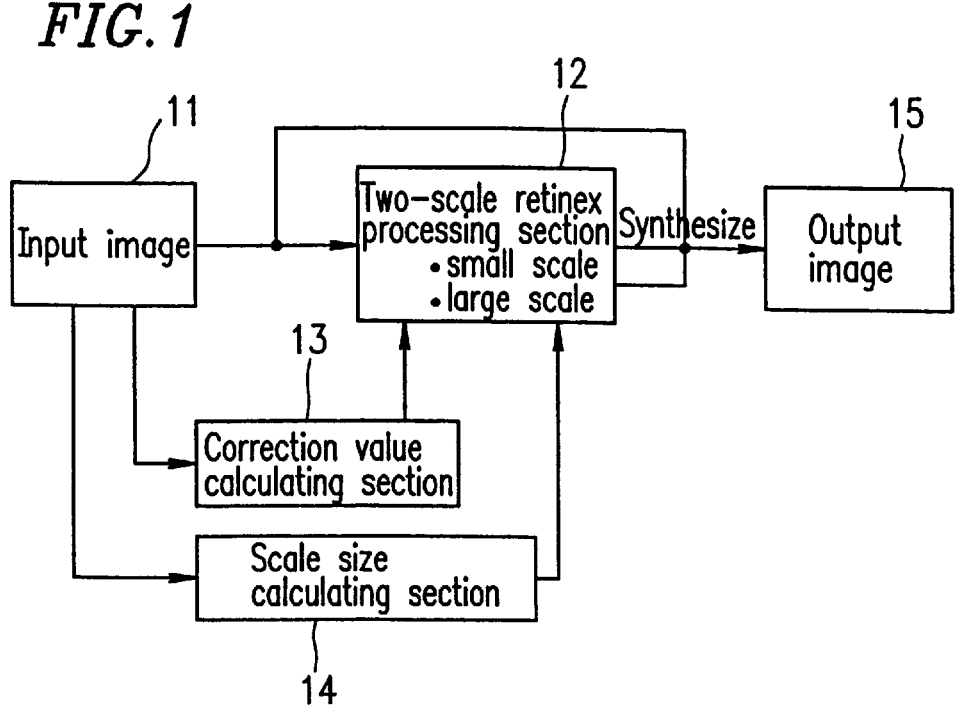
FIG. 1 is a block diagram showing an exemplary lightness correction device for use in implementation of a method for correcting the lightness of images according to the present invention.
Figure 2:
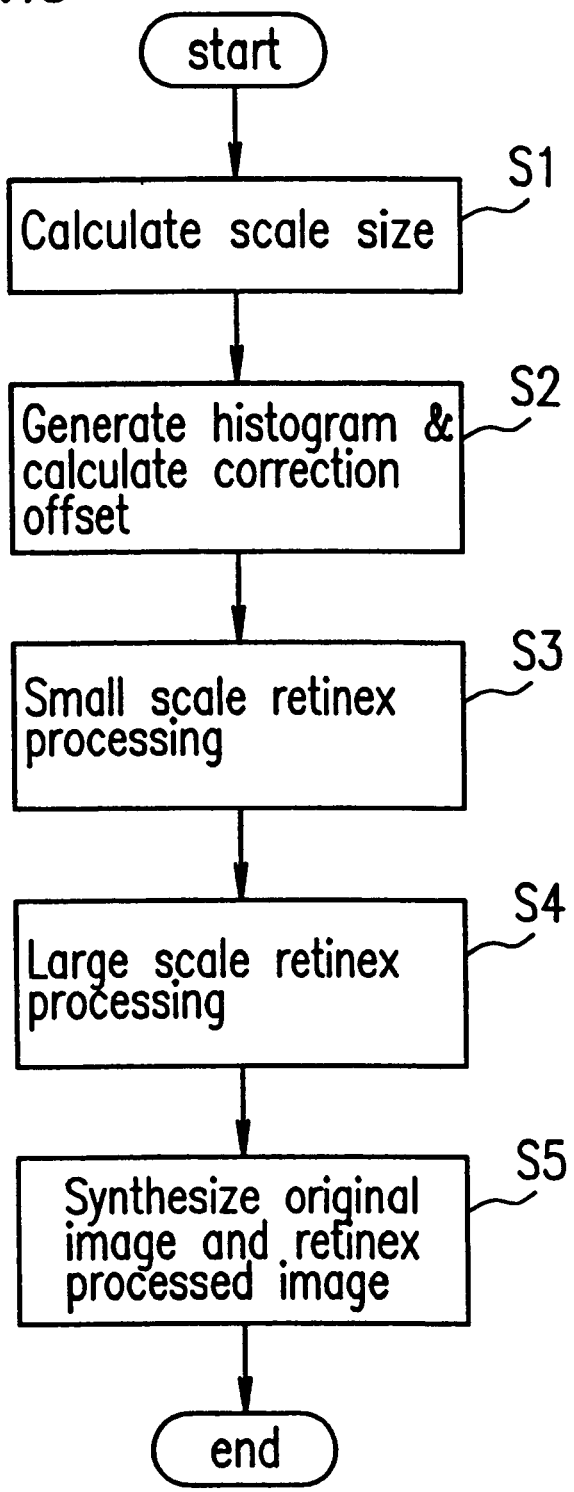
FIG. 2 is a flowchart for illustrating an operation of the lightness correction device.

Hereinafter, an embodiment of the present invention will be described with reference to the drawings. FIG. 1 is a block diagram showing an exemplary lightness correction device f or use in implementation of a method for correcting the lightness of images according to the present invention. FIG. 2 is a flowchart for illustrating an operation of the lightness correction device.

In the lightness correction device shown in FIG. 1, when an input image 11 is read into the lightness correction device, the image size of the input image 11 is transmitted to a scale size calculating section 14 for calculating a scale size of an image. In the scale size calculating section 14, based on the received image size of the input image 11, the scale sizes of the small and large scales are calculated, respectively (see step S1 of FIG. 2). In the large scale, a scale size is calculated so that the radius of the large scale is equal to ½ of a longer side of the input image. In the small scale, a scale size is calculated so that the radius of the small scale is equal to 0.4×(the radius of the large scale), i.e., 0.2×(a longer side of the input image).

However, the radiuses of the small and large scales are not limited to the values shown above, but may be modified and set to appropriate values in accordance with the quality, size, etc., of an input image.

After the scale sizes of the large and small scales have been calculated in the scale size calculating section 14, these calculated scale sizes are transmitted to a two-scale retinex processing section 12.

On the other hand, image information of the input image 11 is transmitted to a correction value calculating section 13. In the correction value calculating section 13, a histogram of the lightness value against the number of pixels is generated based on the image information of the input image, and an offset correction value Ao is calculated based on the histogram (Step S2).

Figure 3A:
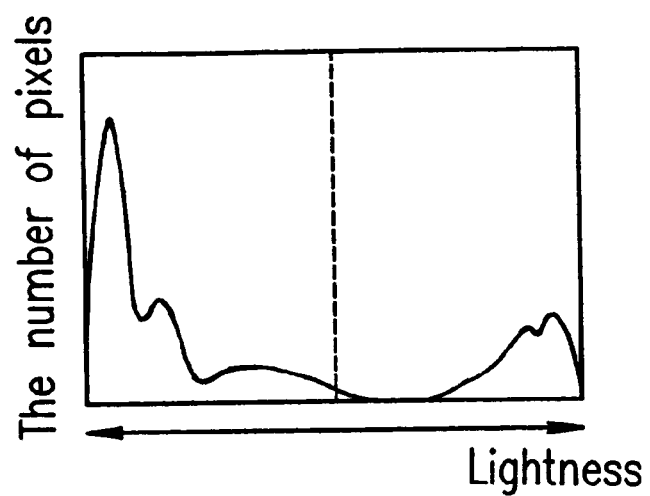
FIG. 3A is an exemplary histogram of the lightness value against the number of pixels of the original image.
Figure 3B:
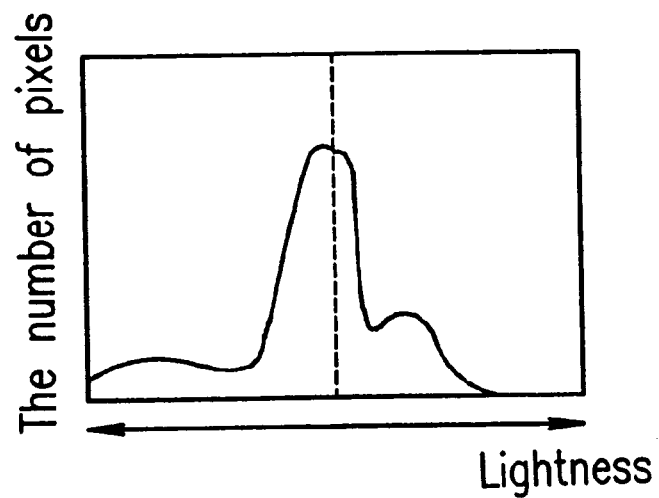
FIG. 3B is an exemplary histogram of the lightness value against the number of pixels with a compressed dynamic range after the retinex processing.

Specifically, a histogram of the lightness value against the number of pixels as shown in FIG. 3A is generated based on the image information of the input image. In this histogram, the number of pixels (vertical axis) against the lightness (horizontal axis) is converted into a graph. In this histogram, pixels are counted from a pixel having the smallest lightness up to a pixel having the greatest lightness, and the lightness of the midpoint pixel of these pixels (i.e., a pixel which halves all the pixels into a group of the brighter pixels and a group of the less brighter pixels) is adopted as the offset lightness value Yo. FIG. 3B is a graph showing the distribution of the lightness with the compressed dynamic range after the retinex processing. That is, the offset lightness value Yo is set so that the number of pixels having a lightness value greater than the offset lightness value Yo is equal to the number of pixels having a lightness value smaller than the offset lightness value Yo.

Thereafter, in the correction value calculating section 13, an offset correction value Ao is obtained based on the offset lightness value Yo and an average lightness value Yv in the quantitized histogram by expression (8):

$$Ao=Yv+(Yv-Yo)/3 \qquad \ldots (8)$$

Herein, the denominator "3" in expression (8) was obtained from experimentation.

After the offset correction value Ao has been obtained in the correction value calculating section 13, the offset correction value Ao is transmitted to the two-scale retinex processing section 12.

In the two-scale retinex processing section 12, based on image information of the input image 11, the single retinex processing is performed with respect to the two types of scale sizes, i.e., the small and large scales, which have been obtained from the scale size calculating section 14 (step S3 and step S4). The retinex processing with each of the small scale and the large scale is conducted for respective spectrum band components of the input image 11 similarly to the conventional single retinex processing. In this case, the surround function is also represented by expression (2). Furthermore, the scalar coefficiency K is set so that the total value of the surround function is 1, i.e., $\int\int F(x,y)dxdy=1$ is satisfied.

As described above, the single scale retinex processing is performed for the respective scale sizes (small and large scale sizes). Then, the result of the single retinex process for each of the scale sizes is multiplied by a weighting factor $\omega_n$, and the multiplication results are totaled, thereby obtaining the result of the multiscale retinex processing, $R_{MSRi}$. Thereafter, the result RMSRi is corrected by expression (6) based on the color correction coefficient Ci(x,y) represented by expression (5).

The thus-obtained result of color correction multiscale retinex processing, $CR_{MSRCRi}$ (x,y), is corrected by expression (7) based on the offset correction value Ao calculated in the correction value calculating section 13 and the preset gain correction value Ag.

As described above, in the two-scale retinex processing section 12, the input image 11 is multiscale retinex processed based on the two types of scales, i.e., the large and small scales, whose scale sizes are each calculated based on the size of the input image 11 in the scale size calculating section 14. The multiscale retinex processed image is extended to conform to an appropriate dynamic range based on the offset correction value Ao calculated in the correction value calculating section 13 and the preset gain correction value Ag, and is output as a result of the final color correction multiscale retinex processing, $I_{MSRCRi}$.

Thereafter, the result of the final color correction multiscale retinex processing, $I_{MSRCRi}$, output from the two-scale retinex processing section 12 is synthesized with the image information of the input image 11, and output as an output image (Step S5).

According to the method for correcting the lightness of images of the present invention, the lightness of an image is corrected based on an original image and a result of a multiscale retinex processing that is performed on the original image with respect to two types of scale sizes (i.e., with the small and large scales) which are obtained based on the image scale of the original image. Thus, an unsmooth gradation of the image due to the two types of retinex processing results is lessened by the synthesis with the original image, whereby the image deterioration is suppressed, and an appropriate lightness correction processing is performed in accordance with the image size. Furthermore, the memory capacity used for calculation, the number of accesses, and the calculation amount are significantly reduced, whereby the multiscale retinex processing can be quickly performed. Furthermore, the offset correction value used for correcting the result of the multiscale retinex processing is calculated based on the histogram of the lightness value against the number of pixels. Therefore, the correction of the lightness is flexibly performed on the original image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for correcting lightness of an image, comprising the steps of:

calculating a first scale and a second scale, which correspond to an inputted image size, based on an image scale of an original image including a plurality of pixels from image information of the original image;

multiscale retinex processing the original image with respect to the first scale and the second scale to produce a multiscale retinex processing result;

calculating an offset correction value based on a histogram of a lightness value against the number of pixels of the original image;

correcting said multiscale retinex processing result based on a gain correction value and said offset correction value to produce a corrected multiscale retinex processing result; and synthesizing said corrected multiscale retinex processing result with the image information of the original image to produce an output image.

2. A method for correcting lightness of an image according to claim 1, wherein the first scale is a small scale, and the second scale is a large scale.

3. A method for correcting lightness of an image according to claim 2, wherein a radius of the large scale is about ½ of a longer side of the original image.

4. A method for correcting lightness of an image according to claim 2, wherein a radius of the small scale is about ⅕ of a longer side of the original image.

5. An image processing device, comprising:

a scale size calculating section for calculating a first scale and a second scale, which correspond to an inputted image size, based on an image scale of an original image including a plurality of pixels from image information of the original image;

a scale retinex processing section for multiscale retinex processing the original image with respect to the first scale and the second scale to produce a multiscale retinex processing result, and a correction value calculating section for calculating an offset correction value based on a histogram of a lightness value against the number of pixels of the original image, wherein said scale retinex processing section corrects said multiscale retinex processing result based on a gain correction value and said offset correction value to produce a corrected multiscale retinex processing result, and wherein said scale retinex processing section synthesizes said corrected multiscale retinex processing result with the image information, thereby generating an output image.

6. An image processing device according to claim 5 wherein the first scale is a small scale, and the second scale is a large scale.

7. An image processing device according to claim 6, wherein a radius of the large scale is about ½ of a longer side of the original image.

8. An image processing device according to claim 6, wherein a radius of the small scale is about ⅕ of a longer side of the original image.

* * * * *